US005177848A

United States Patent [19]

Halstead

[11] Patent Number: 5,177,848

[45] Date of Patent: Jan. 12, 1993

[54] HAND TOOL FOR GENERATING SIMULTANEOUS PUSHING AND PULLING FORCES

[76] Inventor: L. E. Halstead, Rte. 5, Box 1415, Bainbridge, Ga. 31717

[21] Appl. No.: 805,842

[22] Filed: Dec. 5, 1991

[51] Int. Cl.[5] .............. B23P 19/04

[52] U.S. Cl. .............. 29/246; 29/261

[58] Field of Search .............. 29/246, 261, 268, 259, 29/260, 263, 265

[56] References Cited

U.S. PATENT DOCUMENTS 1,388,839 8/1921 Allen .............. 29/261

1,521,786 1/1925 Moss .............. 29/246

2,486,851 11/1949 La Ville et al. .............. 29/246

4,941,252 7/1990 Haisch et al. .............. 29/261

*Primary Examiner*—Robert C. Watson

*Attorney, Agent, or Firm*—Terry M. Gernstein

[57] ABSTRACT

A hand tool includes a handle section having two L-shaped legs with a pulling leg attached to each handle leg. The handle legs are pivotally attached to each other by a pivot bolt and a pusher element is attached to that pivot bolt. As the handles are squeezed together, the pulling legs are moved in one direction and the pusher element is moved in an opposite direction. Thus, a moving the handles toward or away from each other generates simultaneous pushing and pulling forces. The pulling legs can be releasably or permanently attached to the handle, and an extension element can be releasably attached to the pushing element.

10 Claims, 4 Drawing Sheets

HAND TOOL FOR GENERATING SIMULTANEOUS PUSHING AND PULLING FORCES

TECHNICAL FIELD OF THE INVENTION

The present invention relates to the general art of hand tools, and to the particular field of hand tools that are used to remove one element from another.

BACKGROUND OF THE INVENTION

Many jobs, such as are often performed by a mechanic, require that pulling and pushing forces be simultaneously applied to a workpiece. The pressed-on parts found in an automobile drive train and gear train are examples of such workpieces. Other examples include battery and cable connectors.

Separating such workpieces from elements on which they are mounted requires establishing a shear force between the workpiece and the element. That is, the workpiece is forced one way with respect to the element, while force is applied to the element in the opposite direction. Generation of such shear forces is generally achieved by pulling the workpiece with respect to the element. The element is generally fixed so the workpiece is generally grasped and pulled off the element.

Prior to this disclosure, a mechanic had to generate this shear force by gripping the workpiece with one tool while also gripping the element with another tool. Pulling force is then applied to the workpiece. This is somewhat inefficient since only pulling force is applied. It can also be cumbersome and dangerous in some instances. Another problem with the presently-available tools is their inability to apply pulling force at precise locations on a workpiece. That is, if only one portion of a workpiece need be pulled, many presently-available tools must still grasp the entire workpiece. This may be cumbersome and difficult, especially if only a portion of a workpiece is easily accessible to the tool. Still further, a pulling force exerted by a grasping tool, such as pliers, may mar the surface of a workpiece.

Yet another problem with such grasping tools is the possibility that the workpiece will be so firmly fixed to the element that the workpiece and/or the element is damaged or broken during the separation procedure. That is, the element may actually be broken off its own mounting during the removal process.

Therefore, there is a need for a hand tool that can efficiently remove a workpiece from another element. More specifically, there is a need for a hand tool that can efficiently generate shear forces between a workpiece and an element from which that workpiece is being removed.

OBJECTS OF THE INVENTION

It is a main object of the present invention to provide a hand tool that can efficiently remove a workpiece from another element.

It is another object of the present invention to provide a hand tool that can efficiently remove a workpiece from another element and that can efficiently generate shear forces between the workpiece and the element from which it is being removed.

It is another object of the present invention to provide a hand tool that can efficiently remove a workpiece from another element and that can efficiently generate shear forces between the workpiece and the element from which it is being removed by generating shear forces between the workpiece and the element.

It is another object of the present invention to provide a hand tool that can efficiently remove a workpiece from another element and that can efficiently generate shear forces between the workpiece and the element from which it is being removed by simultaneously generating pushing forces and pulling forces on the element and on the workpiece.

It is another object of the present invention to provide a hand tool that can efficiently remove a workpiece from another element and that can efficiently generate shear forces between the workpiece and the element from which it is being removed and which can be modified to precisely apply such shear forces to a selected location on a workpiece.

It is another object of the present invention to provide a hand tool that can efficiently remove a workpiece from another element and that can efficiently generate shear forces between the workpiece and the element from which it is being removed and which can be operated without marring or damaging either the workpiece or the element from which it is being removed.

It is another object of the present invention to provide a hand tool that can efficiently remove a workpiece from another element and that can efficiently generate shear forces between the workpiece and the element from which it is being removed and which can be operated in a dexterous manner.

SUMMARY OF THE INVENTION

These, and other, objects are achieved by a hand tool that can simultaneously generate pushing and pulling forces, with one of the forces being applied to a workpiece and the other of the forces being applied to an element from which the workpiece is being removed. For example, a pulling force can be applied to a cable while a pushing force is being simultaneously applied to a cable mount. The pulling force can be applied to the bottom of the workpiece.

Specifically, the hand tool of the present invention includes a handle unit that has two L-shaped handles each including a short leg that has a heel and a toe thereon. A pivot bolt pivotally attaches the toes of the two short legs together and a pushing element is connected at one end thereof to the pivot bolt an has a second end that engages either the workpiece or the element from which the workpiece is being removed. A pulling leg is attached at one end thereof to each heel of the short legs and engages the other of the workpiece and the element via the other end of that pulling leg.

Pulling the long legs of the hand tool towards each other causes the toes to pivot about the pivot bolt. Each of the handle and pulling legs acts as a second degree lever in which the working force is generated from a location between the fulcrum and the applied force. The applied force is applied to the handle long legs, and the working force is applied by the distal ends of the pulling legs. The distal ends of the pulling legs are engaged with either the workpiece or the element, preferably the workpiece. The fulcrum is also located on the other portion of the workpiece/element combination. Therefore, the force resisting the pulling is generated by the other element of the combination. For example, if a bolt is being removed from a stem, the bolt represents the workpiece and the stem represents the element. The pulling leg distal ends are engaged with the bolt, preferably the rear end of the bolt if possible, and the pushing element is abutted onto the stem whereby the stem acts as the fulcrum of the second degree lever. When the handle long legs are pulled together, the pulling force acts against the fulcrum, and hence, against the stem as a pushing force. This pulling/pushing combination establishes a shear between the workpiece and the element which is magnified since the more pull there is, the greater the push is generated.

Thus, rather than having a user apply only pulling force to a workpiece, the tool of the present invention permits a user to generate pushing force in association with the pulling force thereby increasing the effect of his or her effort with respect to removing the workpiece from the element.

The legs of the preferred form of the tool are removably attached to the handle so that force can be precisely applied and need not be applied to areas of a workpiece that do not need such force. Still further, since the legs are removable, if the workpiece is not easily accessible, removing one leg may permit the tool to be inserted into an otherwise inaccessible location.

The preferred form of the device further includes an extension element that can be removably and movably attached to the pushing element so the size of the tool can be modified to meet different needs and different situations.

BRIEF DESCRIPTION OF THE DRAWING FIGURES

DETAILED DESCRIPTION OF THE PREFERRED EMBODIMENT OF THE INVENTION

Figure 1:
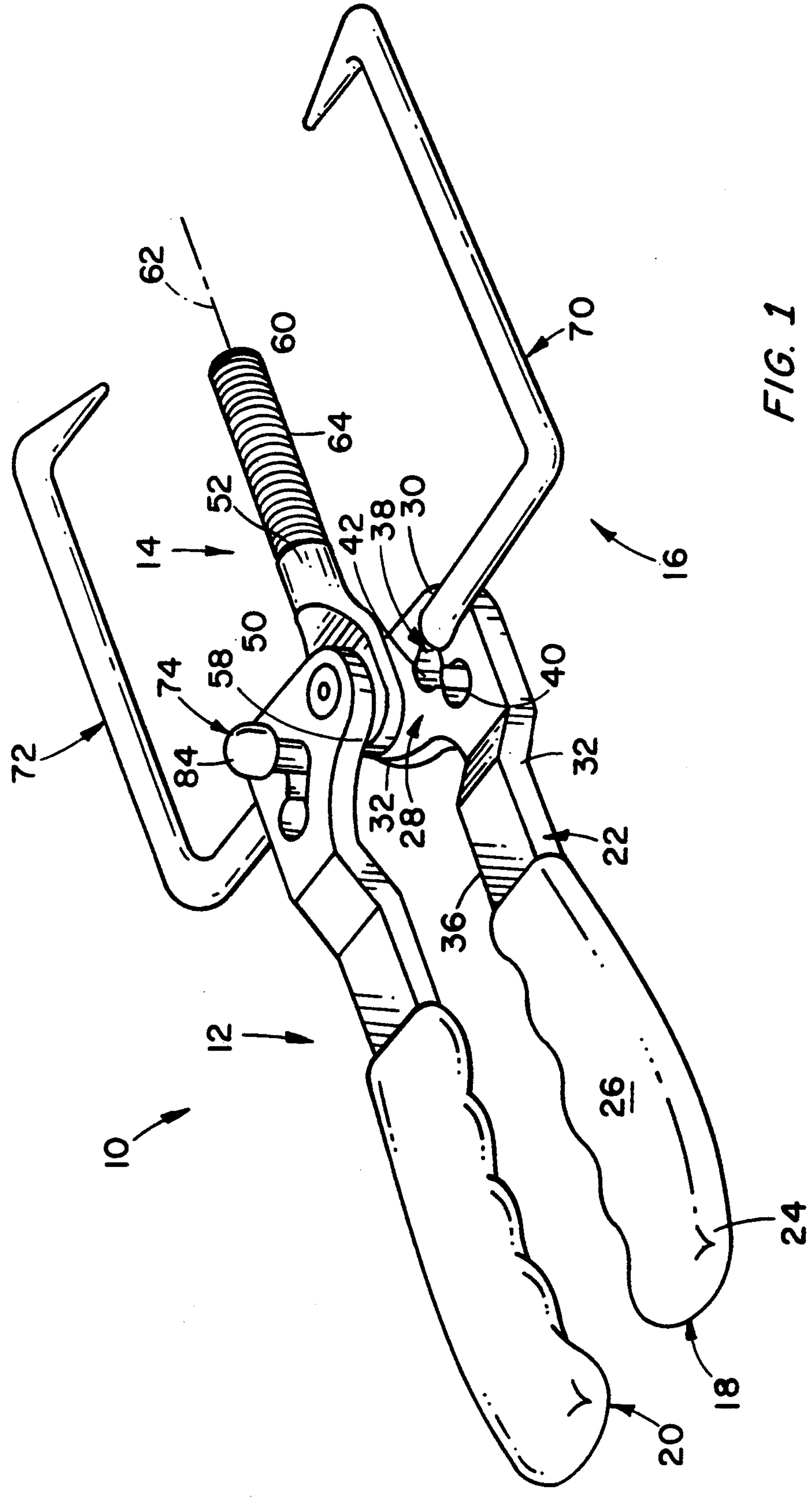
FIG. 1 is perspective view showing the preferred form of the hand tool embodying the present invention.

Shown in FIG. 1 is a hand held tool 10 that can simultaneously generate pulling and pushing forces. The tool comprises a handle unit 12 that is grasped by a user, a pushing unit 14 attached thereto along with a pulling unit 16. The tool can be used to remove a workpiece, such as bolt, from an element, such as a stem by pulling on the workpiece and pushing on the element. The combined pulling and pushing sets up a shear force combination on the workpiece relative to the element that acts to remove the workpiece from the element.

Figure 5:
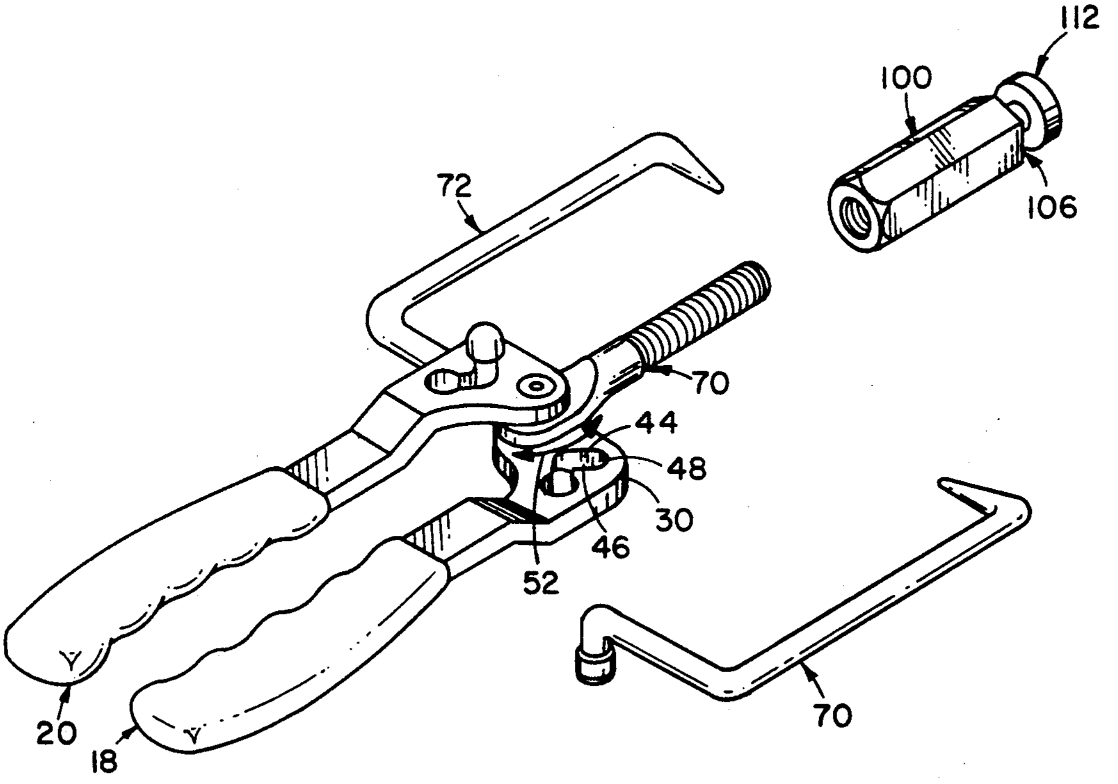
FIG. 5 is an exploded perspective view of a hand tool in combination with an extension element.

Specifically, referring to FIGS. 1 and 5, the handle unit 12 includes two identical L-shaped handles 18 and 20. Since the handles are identical, only handle 18 will be described. Handle 18 includes a long leg 22 having a gripping end 24 that can be covered with a plastic grip 26, or the like, and a short leg 28. The short leg 28 has a heel 30 and a toe 32, with the heel being a continuation of side 34 of the long leg, and the toe being spaced from both the heel and from side 36.

A slot 38 is defined through the short leg and includes a circular cutout 40 having a diameter and an arcuate opening 42 having a width measured between walls 44 and 46 defined by the short leg. The width of the arcuate opening is less than the diameter of the circular cutout for a purpose that will be understood from the ensuing disclosure. The arcuate opening has an end 48 located near the heel 30.

A pivot bolt 50 is received through a pivot bolt receiving opening defined in the short leg adjacent to the toe 32 so the handle can pivot about the pivot bolt in the directions indicated by the double-headed arrow 52. This pivoting motion will be discussed in greater detail below, and causes the short legs to move in opposite directions with respect to each other. That is, one handle moves clockwise about the pivot bolt while the other handle moves counterclockwise about the bolt when the handle long legs are pulled toward each other.

The pushing element 14 includes a body 56 having a proximal end 58 connected to the pivot bolt and a distal end 60 spaced from the pivot bolt. The body 56 has a longitudinal centerline 62 that intersects the pivot bolt, and a screw thread 64 extending from the distal end toward the proximal end. The body 56 moves with the pivot bolt in a linear direction along the body longitudinal centerline. The distal end 60 is adapted to engage an element from which a workpiece is being removed to push on that element.

Figure 2:
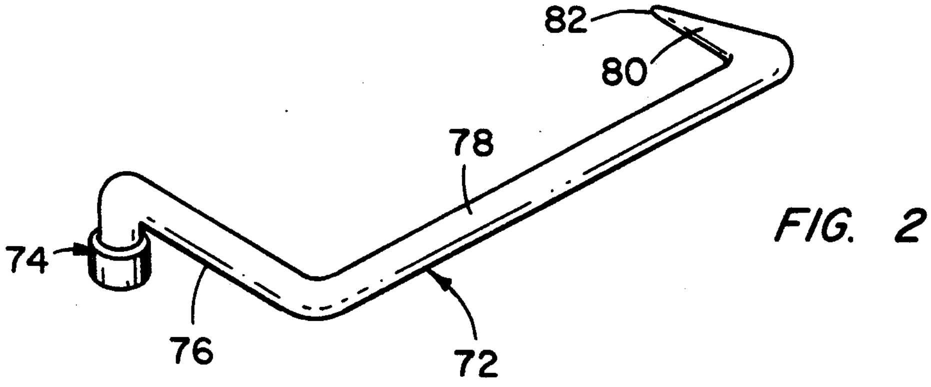
FIG. 2 is a perspective view of a pulling leg.

The pulling unit 16 includes two identical legs 70 and 72. Since the legs are identical, only leg 72 will be described. Referring to FIGS. 1, 2 and 5, it can be seen that leg 72 is C-shaped and includes a proximal end 74 attached to the handle unit short leg near the heel of that handle unit handle. The leg is attached to the handle unit heel to move with that heel as the handles pivot about the pivot bolt. The leg 72 further includes a first section 76 attached at one end thereof to the proximal section and a second section 78 attached at one end to another end of the first section and having a second end attached to one end of a third section 80. The other end 82 of the third section is pointed, and the third section 80 extends back towards the proximal end 74 although it is spaced from that distal end in two planes.

Each leg further includes a knob 84 on the end 74. This knob has an outer diameter smaller than the diameter of the cutout 40 but larger than the width of cutout 42. Therefore, the knob is sized to slide through the cutout 40 but to engage the body 28 adjacent to the cutout 42 whereby the legs 70 and 72 can be removed and replaced, but once replace will be securely held on the handle unit.

The end 82 engages the workpiece, preferably on one end of that workpiece, and pulls the workpiece towards the pivot bolt when the handles 18 and 20 are squeezed together.

Figure 3:
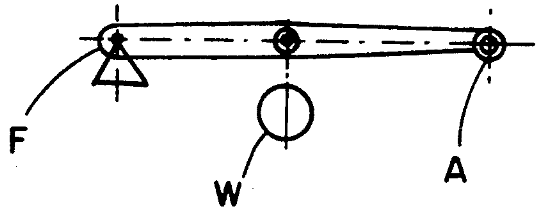
FIG. 3 illustrates a second degree lever.

Referring to FIGS. 1, 5 and 3, it can be seen that the combination of each handle, the pivot bolt and the leg attached to that handle is a second degree lever. As shown in FIG. 3, a second degree lever includes a working force W located between an applied force A and a fulcrum F. Comparing FIGS. 1 and 3, it is seen that the fulcrum F corresponds to the pivot bolt 50, the applied force A corresponds to the force applied to the handles 18 and 20 when a user squeezes those two handles towards each other, and the working force W corresponds to the force applied to the ends 74 of the legs 70 and 72.

Figure 6:
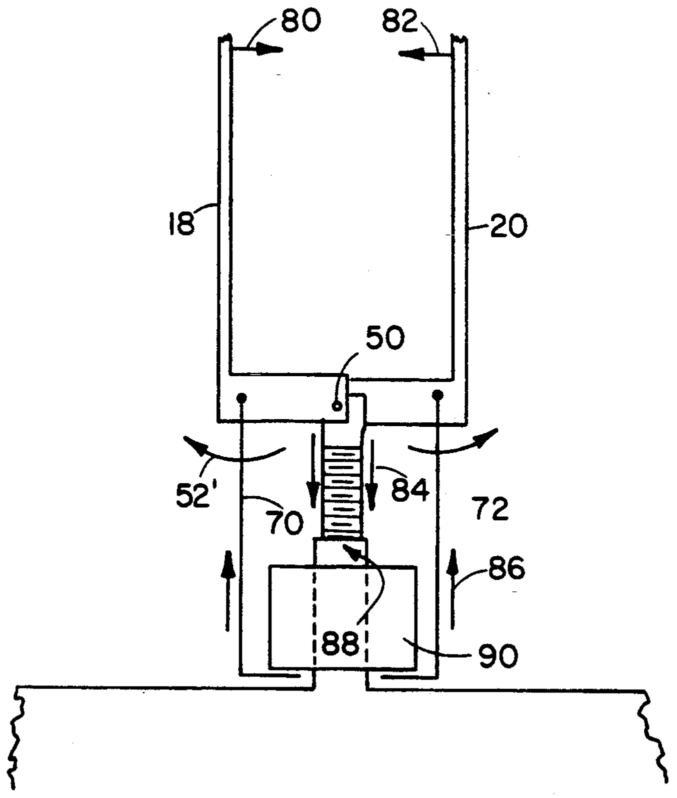
FIG. 6 illustrates the operation of the hand tool in combination with a bolt in combination with a stem.

Operation of the tool is illustrated in FIG. 6. As handles 18 and 20 are pulled toward each other as indicated by arrows 80 and 82, the short legs pivot about pivot bolt 50 in directions 52'. This pivoting motion causes the pivot bolt to be forced in direction 84 and the heels 30 to move the legs 70 and 72 in direction 86. With the direction 86 being opposite to the direction 84 because of the second degree nature of the lever.

As seen in FIG. 6, the distal end 60 of the pushing element engages an end of an element 88 from which a workpiece 90 is being removed. The direction of motion 84 causes the pusher element to push against the element 88 while the direction of motion 86 causes the legs 70 and 72 to pull the workpiece in direction 86 that is opposite to the pushing direction 84. Shear forces are set up between the workpiece 90 and the element 88 that cause the workpiece to be removed from the element 88. The harder the push, the harder the pull so that the pushing and pulling motions cooperate with each other to increase the shearing forces.

Figure 4:
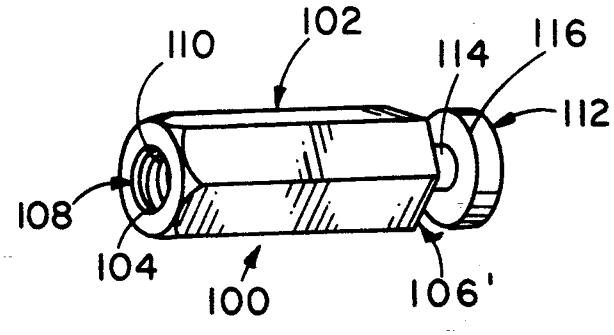
FIG. 4 is a perspective view of an extension element used in conjunction with the hand tool.

As shown in FIGS. 4 and 5, the tool can include an extension element 100. The extension element 100 includes a tubular body 102 having a first end 104 and a second end 106, with a blind-ended bore 108 extending from the first end towards the second end along the longitudinal centerline of the extension element. A screw thread 110 is defined in the body adjacent to the bore, and is sized to cooperatively engage with the screw thread 64 on the pushing element body. A foot element 112 is attached to the second end 106 and includes a pivot shaft 114 attached at one end thereof to the second end 106 and having an element engaging base 116 rotatably mounted on the other end thereof. The extension element is placed on the pushing element body to adjust the length of the pushing unit.

Figure 7:
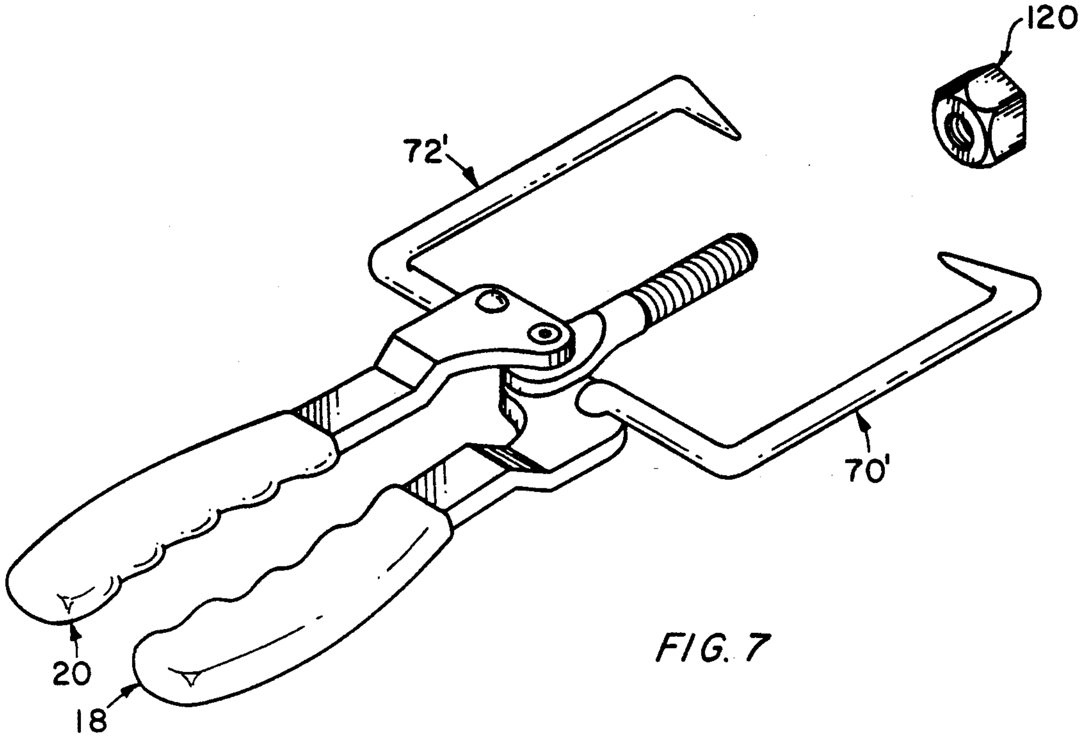
FIG. 7 is an exploded perspective view of an alternative form of the hand tool of the present invention.

An alternative form of the hand tool is shown in FIG. 7 as tool 10'. Tool 10' is identical to tool 10 except that the legs 70' and 72' are permanently attached to the handle unit, and a set nut 120 is included. The nut 120 can be placed on the pushing unit body between the end 56 and the top end 104 of the extension element 100 whereby the extension element is interpositioned between the nut 120 and the body distal end 60.

It is understood that while certain forms of the present invention have been illustrated and described herein, it is not to be limited to the specific forms or arrangements of parts described and shown.

I claim:

1. A hand tool for generating simultaneous pushing and pulling forces comprising:

A) a handle unit that includes (1) two L-shaped handles, each having a long leg and a short leg and a heel located at one end of said short leg and a toe located at another end of said short leg;

(2) a pivot bolt connecting one short leg to a second short leg at the toes of each of said short legs whereby movement of one long leg towards another long leg causes said short legs to pivot about said pivot bolt with respect to each other with one short leg moving clockwise about said pivot bolt and said second short leg moving counterclockwise about said pivot bolt and said heels and toes moving in opposite directions with respect to said pivot bolt when said handle long legs are moved toward or away from each other;

B) a pushing element that includes a body having a proximal end connected to said pivot bolt and a distal end spaced from said pivot bolt, said pushing element body being forced longitudinally thereof in the direction of said handle unit toes when said handle unit handle long legs are moved toward or away from each other;

C) two pulling legs, each pulling leg including a body having a proximal end attached to one of said heels to move therewith and a distal end spaced from said pushing element body distal end;

D) an extension element and attaching means having threaded elements for releasably attaching said extension element to said pushing element; and E) mounting means for releasably mounting each of said pulling legs to an associated one of said holes, said mounting means including a slot defined through each heel with each slot including an arcuate opening on one end thereof and an arcuate section extending from said opening, said arcuate section having a width defined between walls on said heel, with said width being smaller than a diameter of said arcuate opening.

2. The hand tool defined in claim 1 further including a workpiece engaging base on said extension element.

3. The hand tool defined in claim 1 wherein said pulling legs are C-shaped.

4. The hand tool defined in claim 1 wherein said mounting means further includes a knob on each pulling leg proximal end, said knob having an outer dimension that is smaller than said opening diameter and larger than said arcuate section width.

5. The hand tool defined in claim 1 wherein said threaded elements include a threaded section on said pushing element body and a threaded section on said extension element.

6. The hand tool defined in claim 5 further including a nut element having threads that are sized to co-operably engage with said pushing element threaded section.

7. The hand tool defined in claim 1 wherein each pulling leg distal end includes a pointed end.

8. The hand tool defined in claim 1 wherein each pulling leg and the handle to which it is attached forms a second class lever.

9. The hand tool defined in claim 8 wherein said pushing element forms a fulcrum for said second class levers.

10. The hand tool defined in claim 9 wherein each pulling leg distal end is spaced from said pushing element body in two planes.

* * * * *